United States Patent [19]
Fujimaki et al.

[11] Patent Number: 4,791,178
[45] Date of Patent: Dec. 13, 1988

[54] RUBBER COMPOSITION FOR USE IN TIRE TREAD COMPRISING A RUBBER COMPONENT, CARBON BLACK AND PROCESS OIL

[75] Inventors: Tatsuo Fujimaki, Higashimurayama; Noboru Oshima, Suzuka, both of Japan

[73] Assignee: Bridgestone Corporation, Tokyo, Japan

[21] Appl. No.: 117,346

[22] Filed: Oct. 27, 1987

Related U.S. Application Data

[63] Continuation of Ser. No. 894,601, Aug. 8, 1986, abandoned.

[30] Foreign Application Priority Data

Aug. 12, 1985 [JP] Japan ................... 60-175913

[51] Int. Cl.$^4$ ................... C08C 19/20; C08F 8/34
[52] U.S. Cl. ................... 525/332.6; 152/209 R; 525/332.5
[58] Field of Search ................ 525/332.5, 332.6, 332.9

[56] References Cited

U.S. PATENT DOCUMENTS

| | | | |
|---|---|---|---|
| 4,334,567 | 6/1982 | Bond | 152/209 |
| 4,367,325 | 1/1983 | Tekeuchi | 526/340 |
| 4,387,757 | 6/1983 | Ogawa | 152/209 |
| 4,433,094 | 2/1984 | Ogawa | 524/496 |
| 4,537,939 | 8/1985 | Hall | 526/179 |
| 4,547,560 | 10/1985 | Hattori | 526/340 |

Primary Examiner—Christopher Henderson
Attorney, Agent, or Firm—Sughrue, Mion, Zinn, Macpeak & Seas

[57] ABSTRACT

A rubber composition for use in tire is disclosed which contains at least 30% by weight, relative to the entire rubber component, of a conjugated diene-monovinyl aromatic hydrocarbon copolymer which uses an organic lithium compound as an initiator. A percentage of vinyl bonds in conjugated diene units in the copolymer molecules is from 50 to 95% and the content of the monovinyl aromatic hydrocarbon units is from 10 to 50% by weight. As physical properties of the vulcanized rubber of the rubber composition, aromatic hydrocarbon copolymer, 200% tensile modulus is from 5 to 50 kgf/cm$^2$ and a temperture integrated value of a loss tangent, $$\int_{20°\,C.}^{100°\,C.} \tan \delta \, dT$$

is from 16 to 56. The tread rubber composition is suitable for a tread of high performance tires, and is excellent in fracture strength, thermal resistance, wear resistance, and road gripping property.

4 Claims, No Drawings

RUBBER COMPOSITION FOR USE IN TIRE TREAD COMPRISING A RUBBER COMPONENT, CARBON BLACK AND PROCESS OIL

This is a continuation of application Ser. No. 894,601, filed Aug. 8, 1986, now abandoned.

BACKGROUND OF THE INVENTION

1. Field of the Invention

The present invention relates to a rubber composition for use in tire treads, and more particularly, the invention relates to a rubber composition for use in treads of high performance tires, which rubber composition contains a special conjugated dienemonovinyl aromatic hydrocarbon copolymer, has a large hysteresis loss and a good road gripping force, and is excellent in fracture strength and wear resistance as well as thermal resistance.

2. Related Art Statement

In order to improve the road gripping force in the treads of the high performance tires, use has been formerly made of butyl rbber, halogenated butyl rubber, emulsion polymerized styrene-butadiene copolymer rubber having a high content of styrene, etc. which have large hysteresis loss. Further, Japanese patent application laid-open No. 60-61,314 disloses that butadiene-styrene copolymer using an organic lithium compound as an initiator is employed as a rubber composition of a tread of high performance tires. However, the percentage of vinyl bonds in butadiene units in this copolymer is lower as compared with that in the present invention.

As compared with diene base rubbers such as high cis polyisoprene rubber, natural rubber, high cis polybutadiene rubber, and emulsion polymerized styrene-butadiene rubber, the rubber materials such as the above-mentioned butyl rubber having large hysteresis loss is poorer in covulcanizability with a diene base rubber and fracture strength. In addition, the emulsion polymerized styrene-butadiene copolymer rubber containing a high content of styrene is unfavorably often likely to produce blow-out under severe use conditions.

Furthermore, since the butadiene copolymer described in Japanese patent application laid-open No. 60-61,314 is low in the vinyl bond content, it is poor in the thermal resistance, that is, blow-out resistance. Therefore, such a butadiene copolymer does not have sufficient level as high performance tread rubber compositions.

SUMMARY OF THE INVENTION

Therefore, it is an object of the present invention to solve the above-mentioned problems, and to provide a rubber composition for use in treads of high performance tires, wherein a rubber component of the rubber composition has an excellent covulcanizability and the rubber composition has large hysteresis loss and is excellent in thermal resistance, fracture strength and wear resistance.

Having made repeatedly strenuous researches to solve the above-mentioned problems, the present inventors have accomplished the present invention upon confirmation that a rubber composition containing a special conjugated diene-monovinyl aromatic hyrocarbon copolymer and having specified physical properties satisfies the above object.

That is, according to the present invention, there is a provision of a rubber composition for use in tire tread, which contains at least 30% by weight, relative to the entire rubber component, of a conjugated diene-monovinyl aromatic hydrocarbon copolymer which uses an organic lithium compound as an initiator and in which a percentage of vinyl bonds in conjugated diene units in the copolymer molecules is from 50 to 95% and the content of the monovinyl aromatic hydrocarbon units is from 10 to 50% by weight, said rubber composition having 200% tensile modulus being from 5 to 50 kgf/cm$^2$ and a temperature integrated value of loss tangent, $$\int_{20°\ C.}^{100°\ C.} \tan \delta\, dT$$

being from 16 to 56 as physical properties of the vulcanized rubber.

The rubber composition for use in the treads of the high performance tire according to the present invention affords excellent thermal resistance, wear resistance, and road gripping force.

These and other objects, features and advantages of the present invention will be well appreciated upon reading of the following description of the invention with understanding that some modifications, variations and changes of the same could be done by the skilled persons in the art to which the invention pertains without departing from the spirit of the invention or the scope of claims appended hereto.

DETAILED DESCRIPTION OF THE INVENTION

The invention will be explained in more detail below.

The conjugated diene-monovinyl aromatic hydrocarbon copolymer used in the present invention is a copolymer between the monovinyl aromatic hydrocarbon and the conjugated diene compound as monomers.

The monovinyl aromatic hydrocarbon includes styrene, p-methylstyrene, m-methylstyrene, p-tert-butylstyrene, α-methylstyrene, chloromethylstyrene, vinyltoluene, etc. Among them, styrene is preferred. The conjugated diene compound includes butadiene, isoprene, pentadiene, 2,3-dimethyl butadiene, etc. Among them, butadiene is preferred.

In the present invention, various diene base rubbers may be used as a rubber to be blended with the above conjugated diene-monovinyl aromatic hydrocarbon copolymer. Particularly, a diene base rubber having a glass transition temperature $T_g$ of not less than −60° C. is preferable. As preferred examples, mention may be made of emulsion polymerized styrene-butadiene copolymer rubber having a high content of styrene, acrylonitrile-butadiene copolymer rubber, chloroprene rubber, etc. Among them, the emulsion copolymerized styrene-butadiene copolymer rubber having a high content of styrene is particularly preferred. The glass transition temperature $T_g$ being not less than −60° C. in the diene base rubber to be blended is preferable in terms of wear resistance, thermal resistance, and gripping property.

If the conjugated diene-monovinyl aromatic hydrocarbon copolymer in the present invention is less than 30% by weight of the rubber component, effects of improving the wear resistance, thermal resistance, and gripping property are small. Thus, it is necessary that the content the copolymer is not less than 30% by weight.

If the percentage of the vinyl bound units in the conjugated diene-monovinyl aromatic hydrocarbon copolymer is less than 50% by weight with reference to the entire conjugated diene polymer portion, thermal resistance is deteriorated, while if it is more than 95%, fracture strength is deteriorated. Thus, it is necessary that the vinyl bond units are in a range from 50 to 95%. Further, a range from 55 to 80% is preferable. On the other hand, if the content of the bound monovinyl aromatic hydrocarbon units in the conjugated diene-monovinyl aromatic hydrocarbon copolymer is less than 10%, hysteresis loss is small and fracture strength is poor, while if it is more than 50%, the block chains of the bound vinyl aromatic hydrocarbon units are likely to increase. Particularly, if the ratio of the chains of not less than 9 in the bound styrene units exceeds 50% of the total styrene units, the dependency of elastic modulus (JIS hardness) in the tire use temperature range (25° C. to 100° C.) upon the temperature becomes larger, and difference in hardness between 25° C. and 100° C. exceeds 14. Thus, not less than 50% is not preferable.

Therefore, it is necessary that the content of the bound monovinyl aromatic hydrocarbon units is from 10 to 50% by weight, and it is preferably in a range from 25 to 40% by weight.

If 200% tensile modulus as a physical property of a vulcanizate of the tread rubber composition containing not less than 30% by weight of the conjugated diene-monovinyl aromatic hydrocarbon copolymer in the present invention is more than 50 kgf/cm², the hysteresis loss becomes smaller and the road gripping force is poor. On the other hand, less than 5 kgf/cm² is improper because both the water resistance and the thermal resistance become poor. Therefore, it is necessary that the 200% modulus is from 5 to 50 kgf/cm². Further, the tread rubber composition affording a range from 5 kgf/cm² to 35 kgf/cm² is particularly excellent in road gripping property, wear resistance, and thermal resistance. Moreover, if the temperature integrated value of the loss tangent of this composition from 20° C. to 100° C., $$\int_{20°\ C.}^{100°\ C.} \tan \delta \, dT$$

is less than 16, road gripping force is poor, while if it is over 56, wear resistance and thermal resistance become poorer. Therefore, it is necessary that $$\int_{20°\ C.}^{100°\ C.} \tan \delta \, dT$$

is in a range from 16 to 56. Further, it is preferable that the above value is in a range of from 30 to 56.

Although the Mooney viscosity ($ML_{1+4}^{100°\ C.}$) of the conjugated diene-monovinyl aromatic hydrocarbon copolymer according to the present invention is not specifically restricted, it is preferably from 30 to 80 from the standpoint of fracture characteristic and processability.

In order to obtain high hysteresis loss, the rubber composition according to the present invention is favorably used when being blended with carbon black having the average particle size of not more than 300 Å in an amount of from 60 to 200 parts by weight, preferably from 80 to 180 parts by weight with respect to 100 parts by weight of the rubber. If it is less than 60 parts by weight, hysteresis loss is small, while if it is more than 200 parts by weigh, the dependency of elastic modulus upon temperature unfavorably becomes larger.

In order to obtain high hysteresis loss, it is also preferable that an extender oil is blended into the rubber composition in an amount of from 30 to 200 parts by weight with respect to 100 parts by weight of the rubber component excluding oil therein. If it is over 200 parts by weight, fracture strength and wear resistance become poor. The compounding amount in a range from 50 to 200 parts by weight is particularly preferred.

In order to obtain high fracture strength, it is preferable that not less than 30% by weight of the whole extender oil contained in the rubber composition according to the present invention is preliminarily contained in the rubber as extender oil.

An aromatic oil is used as the above extender oil. The one having a viscosity specific gravity content shown in the ASTM 02501 being from 0.900 to 0.999 is preferred.

As other compounding ingredients, use may be made of ordinarily used compounding ingredients such as antioxidant, vulcanization accelerator, vulcanizer, etc.

The above detailed rubber composition may be favorably used as the tread rubber of the general high performance tires in the passenger cars, etc. Particularly, it is also most preferably used as the tread rubber in the competition high performance tires which are served under the most severe use conditions.

The conjugated diene-monovinyl aromatic hydrocarbon copolymer according to the present invention may be produced by various manufacturing processes. Industrial manufacturing processes thereof may be either a continuous polymerization or a batch polymerization system. For instance, mention may be made of a manufacturing process in which a copolymer is obtained by copolymerizing a conjugated diene and a monovinyl aromatic hydrocarbon while an organic lithium initiator is used in the presence of an ether or a tertial amine with or without a hydrocarbon solvent. Further, if desired, various modifications are possible. For instance, the above copolymer may be modified by a coupling reaction through adding an appropriate amount of a polyhalogenated compound such as halogenated silicon, a polyester such as an adipic acid diester, a polycarbonate such as an ethylene carbonate, a polyepoxide such as bis(N,N,N',N'-tetraglycidylaminomethyl)benzene, a polyketone, a polyisocyanate such as a tolylenediisocyanate, diphenylmethanediisocyanate, a crude diphenylmethane diisocyanate, divinyl benzene, etc. in the final stage of the copolymerization reaction, or either one or both of a catalyst and a monomer may be additionally added.

The glass transition temperature $T_g$ in the present invention is defined as a temperature at which a curve of a heat capacity changes when the heat capacity of the rubber is measured by a DSC (differential scanning calorimeter) and plotted relative to the temperatures.

In the following, the present invention will be more concretely explained with reference to specific examples. However, they are merely given in illustration of the invention, but should never be interpreted to limit the scope thereof.

Polymers used in Examples and Comparative Examples were obtained by the following processes, and analysis results thereof are given in Table 1.

Polymer A:

Into a reactor of a 20 liter inner volume which was equipped with a stirrer and a jacket were continuously supplied, by pumps, 20 g/min of butadiene containing 100 ppm of 1,2-butadiene and 10 g/min of styrene as a monomer, 150 g/min of cyclohexane and 2.7 g/min of tetrahydrofuran as a solvent, and n-butyllithium as a catalyst at a rate of 0.041 g relative to 100 g of the monomer, and the reactor was controlled at a temperature of 70° C. At a top outlet of the reactor, silicon tetrachloride was continuously added at a rate of ¼ mole relative to 1 mole of n-butyllithium. The reaction mixture was led to a second reactor connected to the upper portion of the first reactor, and a coupling reaction was carried out. At an outlet of the second reactor, 0.5 part by weight of di-tert-butyl-p-cresol and then 60 parts by weight of aromatic oil were added with respect to 100 parts by weight of rubber, and desolvation and drying were carried out according to ordinary ways.

Polymers B and F:

Polymers B and F were obtained by the same process as in Polymer A except that a charging composition of the monomer was changed.

Polymer C:

Polymer C was obtained by the same process as in Polymer A except that 0.030 g of n-butyllithium was used with respect to 100 g of the monomer and no coupling reaction was carried out.

Polymer D:

While polymerization reaction was carried out in the first reactor with the same formulation as in Polymer A, no coupling reaction was performed in the second reactor and instead polymerization reaction was further carried out at 70° C. by continuously supplying 15 g/min of butadiene and 7 g/min of styrene as a monomer, and n-butyllithium. At an outlet of the second reactor, 0.5 part by weight of di-tert-butyl-p-cresol and then 60 parts by weight of aromatic oil were added with respect to 100 parts by weight of the rubber. Thereafter desolvation and drying were carried out according to ordinary ways.

Polymer E:

Into a 5 liter reactor substituted with nitrogen were charged 2500 g of cyclohexane, 0.6 g of ethylene glycol dibutyl ether, and 190 g of butadiene and 310 g of styrene as a monomer, and then polymerization was carried out at 70° C. after the addition of 0.205 g of n-butyllithium. After the polymerization conversion reached almost 100%, coupling reaction was performed through the addition of ¼ mole of silicon tetrachloride with respect to 1 mole of n-butyllithium. Then, 0.5 part by weight of di-tert-butyl-p-cresol and then 60 parts by weight of aromatic oil were added with respect to 100 parts by weight of the rubber, and desolvation and drying were effected according to ordinary ways.

Polymer G:

Polymer G was obtained by the same process as in Polymer A except that a use amount of tetrahydrofuran and a supply amount of styrene were changed.

Polymer H:

Polymer H was obtained by the same process as in Polymer A except that 0.4 g of bispyperidinoethane was used instead of tetrahydrofuran and the temperature of the reactor was changed to 30° C.

Polymer I:

Polymer I was obtained by the same process as in Polymer A except that aromatic oil was changed to 20 parts by weight.

The percentage of the vinyl bonds in the conjugated diene units in these Polymers was determined by an NMR method according to a process described in Journal of the Polymer Science, A2-9, p. 43 (1971).

The ratio of chains of not less than 9 bound styrene units in these Polymers with respect to the entire styrene units (styrene block percentage) was determined by an H-NMR method according to a process described in Polymer, vol. 22, p. 1721 (1981).

TABLE 1

| Oil polymer | Bound amount in polymer | | $(ML_{1+4}^{100°C.})$*2 | Styrene block percentage (%) |
|---|---|---|---|---|
| | vinyl %*1 | styrene % | | |
| Polymer A | 66 | 31 | 42 | 0 |
| B | 63 | 37 | 44 | 0 |
| C | 65 | 33 | 41 | 0 |
| D | 64 | 32 | 45 | 0 |
| E | 61 | 62 | 43 | 53 |
| F | 60 | 6 | 47 | 0 |
| G | 28 | 42 | 39 | 0 |
| H | 98 | 3 | 41 | 0 |
| I | 65 | 33 | 62 | 0 |

Note:
*1 percentage of vinyl bound- containing butadiene units with reference to parts by weight of butadiene
*2 Mooney viscosity of oil polymer

EXAMPLES 1-7 AND COMPARATIVE EXAMPLES 1-7

Rubber compositions were obtained according to a compounding recipe in Table 2 from the Polymers described above and shown in Table 1. Table 3 shows the hardness, 200% modulus, tensile strength, $$\int_{20°C.}^{100°C.} \tan \delta \, dT,$$

blow-out temperature and actual car test results of vulcanizates of these rubber formulations which were vulcanized under vulcanizing conditions of 145° C.×30 minutes. In this case, as the physical properties of the vulcanizate, the 200% modulus was determined according to JIS K6301, and the temperature integrated value of the loss tangent, $$\int_{20°C.}^{100°C.} \tan \delta \, dT,$$

was measured by a mechanical spectrometer manufactured by Reometrix Co. Ltd. under conditions of a shear strain of 1% and a frequency of 10 Hz.

TABLE 2

| | Part by weight |
|---|---|
| Polymer*1 | 100 |
| Aromatic oil*2 | shown in Table 3 |
| ISAF carbon black | shown in Table 3 |
| Stearic acid | 2 |
| Zinc oxide | 3 |
| Antioxidant 810NA*3 | 1 |
| Vulcanization accelerator DM*4 | 1.2 |
| Vulcanization accelerator DPG*5 | 0.6 |

TABLE 2-continued

| | Part by weight |
|---|---|
| Sulfur | shown in Table 3 |

Note:
*[1]only polymer component in oil polymer excluding oil being shown
*[2]total oil of oil in oil polymer and oil added during kneading being shown
*[3]N—phenyl-N'—isopropyl-p-phenylene-diamine
*[4]2,2'-dithio-bis-benzothiazole
*[5]1,3-diphenylguanidine

TABLE 3

| | Copolymer*[1] polymer | part by weight | SBR1500*[2] part by weight | Total*[3] oil part by weight | Carbon black part by weight | Sulfur part by weight | 200%*[4] modulus kgf/cm$^2$ | Tensile*[4] strength kgf/cm$^2$ | Hardness*[4] difference degree | 100° C. 20° C. tan δ | Blowout*[5] temperature °C. | Actual car test*[6] Wear appearance | Motion performance |
|---|---|---|---|---|---|---|---|---|---|---|---|---|---|
| Example 1 | A | 60 | 40 | 100 | 100 | 1.5 | 22 | 160 | 10 | 39.5 | 219 | 5 | 100 |
| Example 2 | B | " | " | " | " | " | 24 | 165 | 11 | 44.1 | 217 | 5 | 105 |
| Example 3 | C | " | " | " | " | " | 20 | 157 | 10 | 40.3 | 223 | 5 | 107 |
| Example 4 | D | " | " | " | " | " | 20 | 163 | 10 | 39.0 | 218 | 5 | 103 |
| Example 5 | I | " | " | " | " | " | 23 | 155 | 11 | 39.7 | 220 | 4 | 98 |
| Example 6 | A | 100 | — | " | " | " | 24 | 158 | 12 | 38.2 | 226 | 4 | 97 |
| Example 7 | A | 60 | 40 | 150 | 150 | " | 19 | 150 | 12 | 47.5 | 210 | 4 | 101 |
| Comparative Example 1 | E | " | " | 100 | 100 | " | 30 | 174 | 17 | 58.7 | 203 | 3 | 93 |
| Comparative Example 2 | F | " | " | " | " | " | 19 | 136 | 12 | 35.6 | 216 | 2 | 87 |
| Comparative Example 3 | G | " | " | " | " | " | 27 | 164 | 15 | 37.0 | 195 | 3 | 92 |
| Comparative Example 4 | H | " | " | " | " | " | 21 | 98 | 16 | 42.7 | 210 | 2 | 83 |
| Comparative Example 5 | A | " | " | " | " | 3.0 | 52 | 195 | 14 | 34.7 | 220 | 4 | 90 |
| Comparative Example 6 | A | 15 | 85 | 20 | 50 | 1.5 | 56 | 212 | 7 | 14.7 | 190 | 3 | 73 |
| Comparative Example 7 | A | 60 | 40 | 220 | 220 | 0.5 | 4 | 65 | 15 | 57.4 | 191 | 1 | 64 |

Note:
*[1]only polymer component in oil polymer being shown
*[2]tread name of emulsion polymerized styrene-butadiene rubber manufactured by Japane Synthetic Rubber Co., Ltd. (T$_g$ = −56° C.)
*[3]sum of extender oil and oil added to rubber during kneading
*[4]measured according to JIS K6301
*[5]measured by Good Rich flexometer
*[6]Tires were prepared in a tire size of 205 60/R15, and run around a circuit of 4.41 km per one turn at 20 times. Tread were appearance was evaluated by five point system. The larger the number, the better the wear appearance. Motion performance was indicated by index based on a difference between a first turn circulating time and 20th turn circulating time by taking a time difference of a tire in Example 1 as 100. A tire having more than 100 has a small time difference and a high motion performance.

As shown in Examples 1 to 7, the rubber composition according to the present invention is excellent in thermal resistance, wear resistance, and road gripping property as the tread rubber composition of the high performance tires to be served in the severe use conditions and is favorably used therefor.

To the contrary, Comparative Examples are low in blow-out temperature and inferior in thermal resistance, wear resistance, and road gripping property.

As shown in the above Examples and Comparative Examples, the present invention can simultaneously satisfy thermal resistance, wear resistance and road gripping property as the tread rubber composition of the high performance tires used in the severe use conditions by using an organic lithium compound as an initiator, employing the conjugated diene-monovinyl aromatic hydrocarbon copolymer having the specified structure alone or blending it at a specified amount ratio with the diene base rubber to obtain the physical properties of the vulcanizate thereof. Such can never be realized by the conventional rubber composition materials.

What is claimed is:

1. A rubber composition for use in tire treads, comprising:
   (A) a rubber component containing at least 30% by weight of a conjugated diene-monovinyl aromatic hydrocarbon copolymer which is prepared using an organic lithium compound as an initiator, wherein the percentage of vinyl bonds in the conjugated diene units in the copolymer molecules is from 55 to 85% and the content of the monovinyl aromatic hydrocarbon units in the copolymer molecules is from 25 to 40% by weight,
   (B) from 80 to 180 parts by weight of carbon black filler with respect to 100 parts by weight of the rubber component, wherein said carbon black filler has an average particle size of not more than 300 Å, and
   (C) from 50 to 200 parts by weight of process oil with respect to 100 parts by weight of the rubber component, wherein said process oil has a viscosity specific gravity constant of from 0.900 to 0.999, wherein said rubber composition has a 200% tensile modulus of from 5 to 50 kgf/cm² and a temperature integrated value of the loss tangent, $$\int_{20°C.}^{100°C.} \tan \delta \, dT$$

of from 30 to 56.

2. The rubber composition according to claim 1, wherein the conjugated diene-monovinyl aromatic hydrocarbon copolymer is a butadiene-styrene copolymer and the ratio of bound styrene units in which nine or more bound styrene units are continuously bonded exceeds 50% of the total styrene units.

3. The rubber composition according to claim 1, wherein said rubber composition has a 200% tensile modulus of from 5 kgf/cm² to 35 kgf/cm².

4. The rubber composition according to claim 1, wherein the conjugated diene-monovinyl aromatic hydrocarbon copolymer has a Mooney viscosity ($ML_{1+4}^{100°C.}$) of from 30 to 80.

* * * * *